United States Patent
Kannan et al.

(10) Patent No.: US 11,036,936 B2
(45) Date of Patent: Jun. 15, 2021

(54) COGNITIVE ANALYSIS AND CONTENT FILTERING

(71) Applicant: International Business Machines Corporation, Armonk, NY (US)

(72) Inventors: Priya Kannan, Bangalore (IN); Ankur Tagra, Bangalore (IN); Shajeer K. Mohammed, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 16/360,418

(22) Filed: Mar. 21, 2019

(65) Prior Publication Data

US 2020/0304466 A1    Sep. 24, 2020

(51) Int. Cl.
    *G06F 40/205*    (2020.01)
    *H04L 29/06*    (2006.01)
    *G06F 16/955*    (2019.01)
    *G06F 16/958*    (2019.01)
    *G06F 16/9032*    (2019.01)

(52) U.S. Cl.
    CPC ...... *G06F 40/205* (2020.01); *G06F 16/90332* (2019.01); *G06F 16/9566* (2019.01); *G06F 16/972* (2019.01); *H04L 63/0236* (2013.01); *H04L 63/0245* (2013.01)

(58) Field of Classification Search
    CPC .................................................. H04L 63/0245
    See application file for complete search history.

(56) References Cited

U.S. PATENT DOCUMENTS

| | | | |
|---|---|---|---|
| 6,144,934 A * | 11/2000 | Stockwell | H04L 29/06 704/1 |
| 7,810,029 B2 | 10/2010 | Holland et al. | |
| 7,962,463 B2 | 6/2011 | Cava | |
| 8,001,105 B2 | 8/2011 | Bolivar et al. | |
| 8,626,930 B2 | 1/2014 | Donelli et al. | |
| 8,732,857 B2 | 5/2014 | Garcia et al. | |
| 9,600,570 B2 * | 3/2017 | Wen | G06F 16/951 |
| 10,303,762 B2 * | 5/2019 | Markman | G06F 40/30 |
| 2003/0009495 A1 * | 1/2003 | Adjaoute | G06F 40/20 715/255 |
| 2003/0123465 A1 | 7/2003 | Donahue | |
| 2006/0242191 A1 * | 10/2006 | Kutsumi | G06F 40/242 |

(Continued)

OTHER PUBLICATIONS https://cipafilter.com/product/features, Feb. 22, 2018.
(Continued)

*Primary Examiner* — Douglas Godbold
(74) *Attorney, Agent, or Firm* — Lieberman & Brandsdorfer, LLC

(57) ABSTRACT

Embodiments are directed to a system, computer program product, and method for application of cognitive processing to a communication, and selectively transmitting the communication based on the cognitive processing. Natural language understanding (NLU) decomposes the communication to identify content and keywords. A dictionary determined to be contextually related to the communication is identified to support and enable a multi-dimensional analysis of the communication content. The communication is subject to dynamic filtering with support of the dictionary and dictionary content. A response is generated from the filtering, and is subject to selective transmission.

18 Claims, 9 Drawing Sheets

(56) References Cited

U.S. PATENT DOCUMENTS

| | | | |
|---|---|---|---|
| 2008/0195567 A1* | 8/2008 | Chen | G06N 5/022 |
| | | | 706/46 |
| 2008/0209057 A1 | 8/2008 | Martini et al. | |
| 2008/0228928 A1 | 9/2008 | Donelli et al. | |
| 2010/0083151 A1* | 4/2010 | Lanza | G06F 16/90332 |
| | | | 715/764 |
| 2012/0167231 A1 | 6/2012 | Garcia et al. | |
| 2013/0060863 A1* | 3/2013 | D'Eri | G06Q 10/107 |
| | | | 709/206 |
| 2014/0095515 A1* | 4/2014 | Korenwaitz | G06F 16/335 |
| | | | 707/748 |
| 2015/0309987 A1* | 10/2015 | Epstein | G06F 40/279 |
| | | | 704/9 |
| 2016/0171109 A1 | 6/2016 | Gnanasekaran | |
| 2017/0212875 A1* | 7/2017 | Foresti | G06F 16/958 |
| 2017/0250989 A1 | 8/2017 | Bhattacharya et al. | |
| 2018/0173696 A1* | 6/2018 | Hosabettu | G06F 16/36 |
| 2018/0307746 A1* | 10/2018 | Du | G06F 16/90324 |
| 2019/0034405 A1 | 1/2019 | Ivan et al. | |
| 2019/0104139 A1* | 4/2019 | Xu | G06N 3/08 |
| 2019/0340255 A1* | 11/2019 | Huyghe | G06F 16/313 |

OTHER PUBLICATIONS

Abdulkader, A., et al., Introducing Deep Text: Facebook's text understanding engine, Jun. 1, 2016, https://code.fb.com/ml-applications/introducing-deeptext-facebook-s-text-understanding-engine/.

Nelson, P., Natural Language Processing (NLP) Techniques for Extracting Informaiton "Cruising the Data Ocean" Blog Series—Part 4 of 6, Feb. 22, 2018, https://www.searchtechnologies.com/blog/natural-language-processing-techniques.

List of IBM Patents or Applications Treated as Related, Mar. 2019.

* cited by examiner

COGNITIVE ANALYSIS AND CONTENT FILTERING

BACKGROUND

The present embodiments relate to an artificial intelligence platform configured to process textual material. More specifically, the embodiments relate to application of linguistics and natural language understanding to the artificial intelligence platform directed at content filtering.

In the field of artificial intelligent computer systems, natural language systems (such as the IBM Watson® artificial intelligent computer system and other natural language question answering systems) process natural language based on knowledge acquired by the system. To process natural language, the system may be trained with data derived from a database or corpus of knowledge, but the resulting outcome can be incorrect or inaccurate for a variety of reasons relating to the peculiarities of language constructs and human reasoning.

Machine learning, which is a subset of Artificial intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and provide relevant recommendations. AI is a subset of cognitive computing, which refers to systems that learn at scale, reason with purpose, and naturally interact with humans. Cognitive computing is a mixture of computer science and cognitive science. Cognitive computing utilizes self-teaching algorithms that use minimum data, visual recognition, and natural language processing to solve problems and optimize human processes.

At the core of AI and associated reasoning lies the concept of similarity. The process of understanding natural language and objects requires reasoning from a relational perspective that can be challenging. Static structures dictate a determined output or action for a given determinate input. The determined output or action is based on an express relationship within the structure. This arrangement may be satisfactory for select circumstances and conditions. However, it is understood that static structures have limitations, and need to adapt to a dynamic environment that is inherently subject to change, and the output or action needs to adapt to accommodate the dynamic environment.

SUMMARY

The embodiment described herein includes a system, computer program product, and a method for cognitive processing of a communication transmission.

In one aspect, a computer system is provided with a processing unit in communication with memory, and an artificial intelligence (AI) platform operatively coupled to the processing unit, configured to apply cognitive processing to a communication transmission. The AI platform is comprised of tools to support cognitive assessment and processing. The tools include, but are not limited to, NL and linguistic managers. The NL manager decomposes content of an intercepted communication, with the decomposition identifying one or more keywords in the communication. The linguistic manager identifies a dictionary that is contextually related to the communication, and functions to invoke a multi-dimensional analysis of the communication. The analysis includes comparison of identified communication keyword(s) against contextually identified keywords from the dictionary. The NL manager selectively applies cognitive processing to the communication and the keyword comparison, which includes identification of communication context and subjecting the communication to dynamic filtering for one or more contextually related keywords. A response from the multi-dimensional analysis is generated, and the communication is selectively transmitted based on the response.

In another aspect, a computer program product is provided to apply cognitive processing to a communication transmission. The computer program product includes a computer readable storage medium with embodied program code that is configured to be executed by a processing unit. Program code is provided to decompose content of an intercepted communication. The content decomposition identifies one or more keywords in the communication. Program code identifies a dictionary that is contextually related to the communication, and functions to invoke a multi-dimensional analysis of the communication. The analysis includes the program code to compare the identified communication keyword(s) against contextually identified keywords from the dictionary. Program code is further provided to selectively apply cognitive processing to the communication and the keyword comparison, including identification of context of the communication and dynamically filter the communication for presence of the one or more contextually related keywords. A response from the multi-dimensional analysis is generated, and the communication is selectively transmitted based on the response.

In an even further aspect, a computer implemented method is provided to apply cognitive processing to a communication transmission. The method decomposes content of an intercepted communication. The content decomposition identifies one or more keywords in the communication. A dictionary that is contextually related to the communication is identification, and a multi-dimensional analysis of the communication is invoked. The analysis includes comparison of the identified communication keyword(s) against contextually identified keywords from the dictionary. Cognitive processing is selectively applied to the communication and the keyword comparison, with the processing including identification of context of the communication and dynamically filtering the communication for presence of the one or more contextually related keywords. A response from the multi-dimensional analysis is generated, and the communication is selectively transmitted based on the response.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments unless otherwise explicitly indicated.

DETAILED DESCRIPTION

Figure 1:
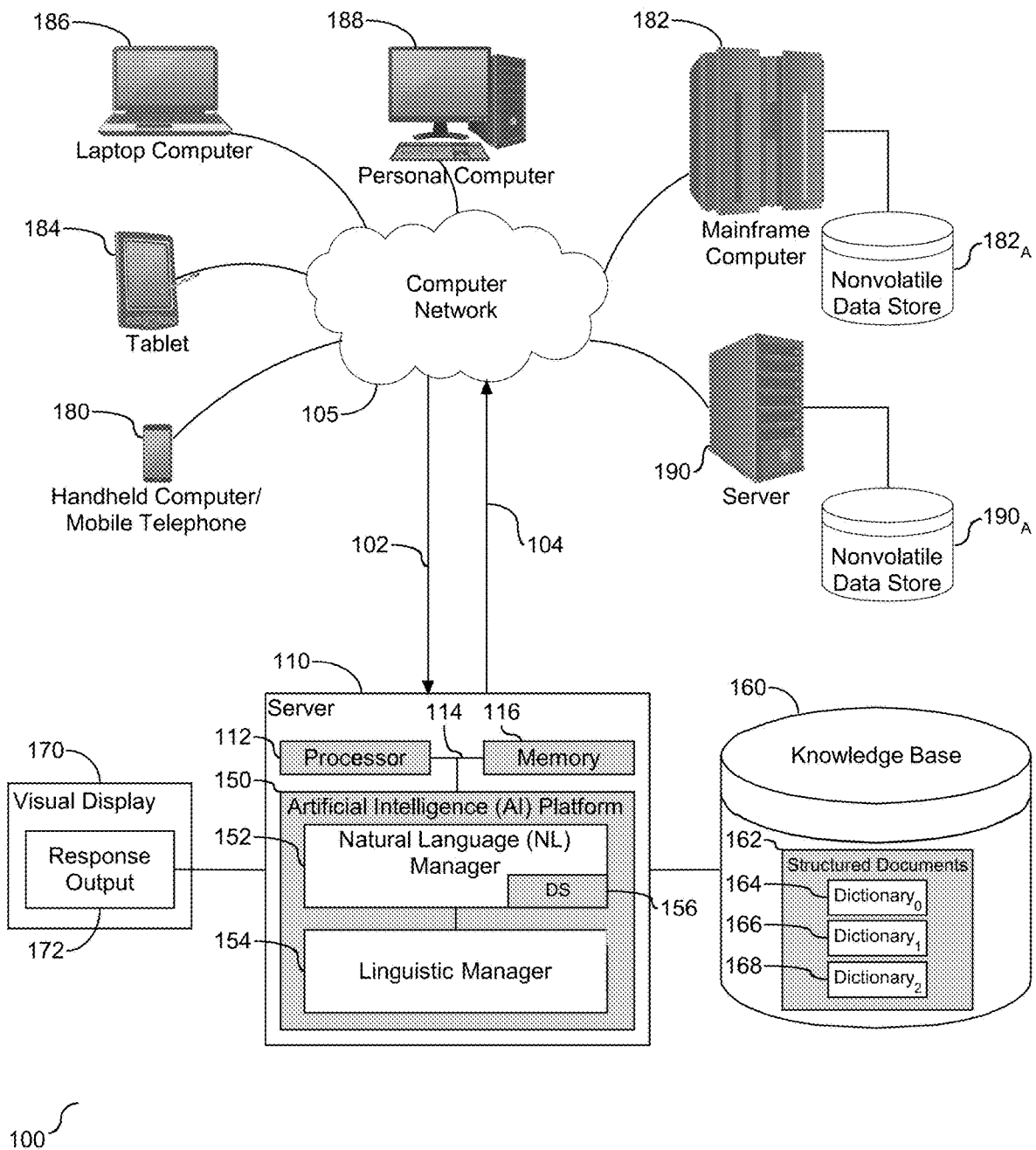
FIG. 1 depicts a block diagram illustrating a text mining system and tools to provide context to word vector and document vector representations, and linguistic processing responsive to the representations.

It will be readily understood that the components of the present embodiments, as generally described and illustrated in the Figures herein, may be arranged and designed in a wide variety of different configurations. Thus, the following detailed description of the embodiments of the apparatus, system, and method, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment of the present embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Content filtering, which in one embodiment is also referred to as information filtering, employs program code to screen or exclude objectionable content, such as electronic communication, electronic message, web site pages, etc. It is understood in the art that prior art content filtering applies specified character strings or keywords, hereinafter referred to collectively as keywords, to identify content to be excluded or otherwise blocked. However, these prior art systems utilize static structure for the content filtering, and more specifically for the character string identification. As shown and described herein computational linguistics is applied to identify linguistically related elements, and is dynamically applied to the content filtering. Computational linguistics is the application of computer science to analysis, synthesis and comprehension of written and spoken language. A computational understanding of language provides insight into substantive aspects of linguistic elements in the underlying texts, and improves the relationship between computers and basic language. One aspect of computational linguistics is directed at building linguistic structures, such as word dictionaries.

As shown and described herein, natural language is a human language, such as English, French, German, etc. Natural language processing (NLP), also referred to herein as computational linguistics, is a component of Artificial Intelligence (AI). NLP is directed at analyzing and understanding the languages that humans use naturally in order to interface with computers on both written and spoken contexts using natural human languages instead of computer language. Specifically, NLP automates the translation between the computer and human languages.

Natural language understanding (NLU) is a sub-topic of NLP in AI that pertains to machine reading comprehension. NLU involves modeling human reading comprehension by parsing and translating input according to natural language principles. In one embodiment, NLU analyzes text by extracting metadata from content and organizing the extracted metadata into a multi-level classification hierarchy. The extracted content subjected to the hierarchical organization may include, but is not limited to, concepts, entities, keywords, categories, sentiment, emotion, relations, and semantic roles.

NLP and NLU both pertain to the relationship between natural language and artificial intelligence. As shown and described herein, NLP is used to identify content and apply one or more filtering actions on the identified content based on content filtering rules. In one embodiment, a dictionary of keywords is consulted, and keywords that populate the dictionary function as the filtering protocol. For example, in one embodiment, a selection of keywords is applied against content, such as a document or website, to determine if any of the keywords are present in the document or website. NLU is used to address context, and more specifically to understanding the context in which the keyword(s) identified in the document or website is being used. It is understood that not every usage of a keyword(s) would be objectionable, e.g. have a negative implication. The NLU addresses keyword and keyword context, and it also addresses context of the document or website. As shown and described in detail below, the context of the document or web site entails a holistic assessment in which sentiment(s) expressed in the document or web site is derived and applied against one or more policies intended for the consumer of the content. An Application Program Interface (API) is understood in the art as a software intermediary between two or more applications, and in one embodiment, one or more API(s) are utilized to perform the above-described NLP and NLU.

As described above, the content filtering is applied against a document or web site. The content filtering utilizes a dictionary or data structure, hereinafter referred to collectively as a dictionary, of keywords. In one embodiment, the dictionary is a multi-dimensional organization that arranges populated keywords by one or more characteristics, such as context. It is recognized that in the NLP and the NLU analysis new and pertinent keywords or string data may have been discovered, with the discovery including the context in which the new keyword is identified. As shown and described below, one or more tools and processes are provided to identify the new keyword(s), tag the keyword(s) with a dimension within the dictionary having the context classification, and dynamically update the dictionary or data structure with the discovered new keyword(s) or string data. Accordingly, NLU is applied to the organization and dynamic growth of the dictionary.

Referring to FIG. 1, a schematic diagram of a computer system (100) is depicted to cognitive analysis and content filtering. As shown, a server (110) is provided in communication with a plurality of computing devices (180), (182), (184), (186), and (188) across a network connection (105). The server (110) is configured with a processing unit (112) in communication with memory (116) across a bus (114). The server (110) is shown with an AI platform (150) for document, context, and linguistic processing over the network (105) from one or more computing devices (180), (182), (184), (186) and (188). More specifically, the computing devices (180), (182), (184), (186), and (188) communicate with each other and with other devices or components via one or more wired and/or wireless data communication links, where each communication link may comprise one or more of wires, routers, switches, transmitters, receivers, or the like. In this networked arrangement, the server (110) and the network connection (105) enable processing of documents and content for one or more content users. Other embodiments of the server (110) may be used with components, systems, sub-systems, and/or devices other than those that are depicted herein.

The AI platform (150) may be configured to receive input from various sources or transmit data to one or more devices. For example, AI platform (150) may receive input from the network (105), one or more knowledge bases of corpus (160) of electronic documents (162), or other data, content users, and other possible sources of input. In selected embodiments, the knowledge base (160), also referred to herein as a corpus, may include structured, semi-structured, and/or unstructured content in a plurality of documents that are contained in one or more large knowledge databases or corpi. The various computing devices (180), (182), (184), (186), and (188) in communication with the network (105) may include access points for content creators and content users. Some of the computing devices may include devices for a database storing the corpus of data as the body of information used by the AI platform (150), and to process the corpus of data with respect to content and context, thereby enhancing natural language based services. The network (105) may include local network connections and remote connections in various embodiments, such that the AI platform (150) may operate in environments of any size, including local and global, e.g. the Internet. Additionally, the AI platform (150) may serve as a front-end system or in one embodiment a back-end system that can make available a variety of knowledge extracted from or represented in documents, network accessible sources and/or structured data sources. In this manner, some processes populate the AI platform (150) with the AI platform (150) also including input interfaces to receive requests and respond accordingly.

As shown, documents or files in the form of one or more electronic documents or files are subject to evaluation by the AI platform (150). The knowledge base (160) is shown operatively coupled to the server (110). The knowledge base (160) is shown with structured dictionaries, shown herein as $dictionary_0$ (164), $dictionary_1$ (166), and $dictionary_2$ (168). Although only three dictionaries are shown, the quantity should not be considered limiting. Each dictionary includes a hierarchy of content. An example of a dictionary and the hierarchical structure of the dictionaries is shown and described in FIG. 4. The documents subject to interception and processing by the AI platform (150) may include any structured and unstructured documents, including but not limited to any file, text, article, or source of data (e.g. scholarly articles, dictionary, definitions, encyclopedia references, and the like). In one embodiment, the intercepted transmission is a web page transmission. The documents may be received from a library, such as the knowledge base (160), or any device operatively coupled to the server (110) across the network (105). Content users may access the AI platform (150) via a network connection or an internet connection to the network (105), and may submit natural language input to the AI platform (150) that may effectively be processed into context, such as word vector representation. As further described below, the context processing, and in one embodiment context representation, enables the content and corresponding context to be mathematically represented.

As shown, the server (110) is in communication with a knowledge base (160) of dictionaries, or in one embodiment data structures. The knowledge base (160) functions as a corpus, and in one embodiment, may be comprised of multiple corpi, including but not limited to a collection of dictionaries and may be a network of dictionary collections. Alternatively, the knowledge base (160) may function as a single corpus. The knowledge base (160) is shown locally coupled to the server (110). In one embodiment, the knowledge base (160) may be operatively coupled to the server (110) across the network (105). In one embodiment, the knowledge base (160) may be stored on shared data storage, such as a cloud shared resource.

As shown, the AI platform (150) is local to the server (110). In some illustrative embodiments, server (110) may be the IBM Watson® Watson system available from International Business Machines Corporation of Armonk, N.Y., which is augmented with the mechanisms of the illustrative embodiments described hereafter. As shown, the AI platform (150) includes an information handling system in the form of managers, e.g. tools, including a NL manager (152) and a linguistic manager (154). Though shown as being embodied in or integrated with the server (110), the AI platform (150) and the associated managers (152) and (154) may be implemented in a separate computing system (e.g., 190) that is connected across network (105) to the server (110). Wherever embodied, the managers (152) and (154) function to provide and assess linguistic analysis of documents with respect to associated context.

The AI platform (150) intercepts or otherwise receives content transmission, and processes the intercepted content prior to continued transmission of the content to a recipient or receiving device. As shown, the AI platform (150) is configured with tools to support the content and context processing, including a NL manager (152) and a linguistic manager (154). The NL manager (152) functions to process a transmitted document or file, hereinafter referred to as a document, received across the network (105). The NL manager (152) functions to evaluate and interpret the document, which in one embodiment includes decomposing the document to identify any keywords present in the document. In the case of a web page transmission, the decomposition identifies web page content and keywords present in the web page. For example, in one embodiment, the NL manager (152) removes all stop words, e.g. insignificant words, from the document, and limits the evaluation to all remaining text in the document, e.g. significant words. The linguistic manager (154), which is operatively coupled to the NL manager (152), functions to process the keywords against a dictionary. More specifically, the linguistic manager (154) identifies a dictionary in the corpus (160), such as $dictionary_1$ (164), that is contextually related to the intercepted communication. Accordingly, the NL manager (152) functions to identify keywords in an intercepted communication, and the linguistic manager (154) identifies and selects a dictionary contextually related to the communication against which the keywords and the communication will be processed.

The linguistic manager (154) functions as an interface between the selected or identified dictionary and the document subject to assessment. Specifically, the linguistic manager (154) compares the keywords identified in the communication against the keywords that populate the dictionary, e.g. dictionary words. This comparison is utilized by the NL manager (152) for cognitive processing of the document. In other words, the NL manager (152) uses the comparison to identify the context of the communication through matching or closely matching dictionary words and their classified context. The NL manager (152) uses the comparison and contextual identification to selectively amend the dictionary. It is understood that the dictionary is not static in that the dictionary dynamically grows and/or changes over time. For example, in one embodiment, the NL manager (152) may identify words in the document that are semantically related to the dictionary keywords, but are not populated in the dictionary. These semantically related words may be dynamically added to the dictionary by the linguistic manager (154). It is understood that each of these semantically related document keywords have associated metadata. This metadata may be utilized for classification and positioning of the keywords in the dictionary. In one embodiment, the metadata remains attached to the keyword after entry in the dictionary. For example, in one embodiment, the keyword has a timestamp identifying when the keyword is added to the dictionary, which may be used at a later point in time for pruning the dictionary.

Figure 4:
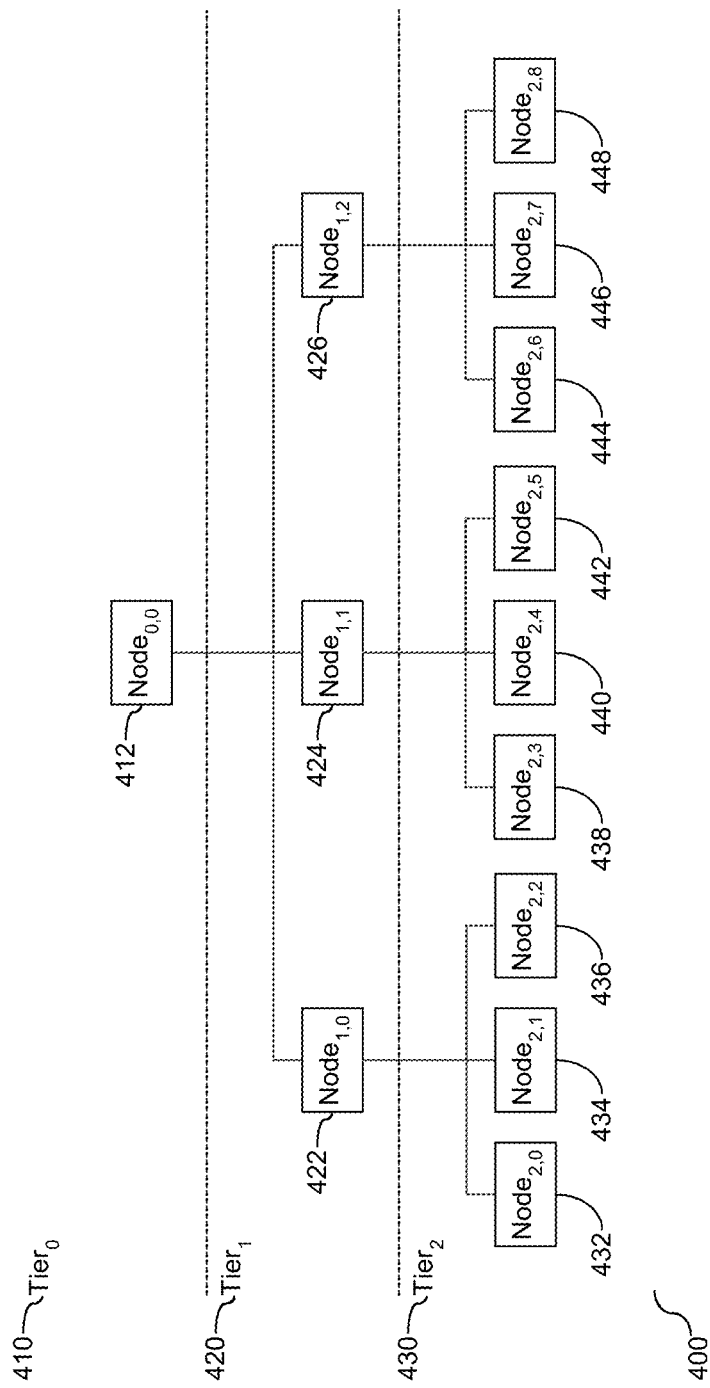
FIG. 4 depicts a block diagram illustrating an example dictionary hierarchy.

As shown and described in FIG. 4, the dictionary may be organized into a hierarchy with multiple tiers, with two or more domains, e.g. nodes in each of the tiers. In one embodiment, the domain is also referred to as a content category, such as finance, health care, government, etc. This organization facilitates contextual identification and evaluation of content. When adding a keyword to the dictionary, the linguistic manager (154) selects or otherwise identifies and selects an appropriately classified dictionary via the hierarchical organization. At the same time, it is understood that the growth of the dictionary is multi-dimensional. In one embodiment, the NL manager (152) identifies one or more secondary or additional keywords in the document that are semantically related to the keyword being processed, and when the keyword being processed is identified to be added to the dictionary, the linguistic manager (154) also processes the semantically related keywords for adding to the dictionary.

The dictionary is subject to growth by adding keywords and semantically related keywords to the hierarchy. At the same time, the dictionary may also support a pruning action, which includes removing words from the dictionary. For example, as mentioned above, as words are added to the dictionary, the added word includes metadata. In one embodiment, the metadata includes at least one field identifying the time the word is added to the dictionary and the source of the word. These metadata fields are examples, and should not be considered limiting. In one embodiment, the words may include additional and/or different metadata fields. Using the example fields described, the linguistic manager may identify dictionary words based on a metadata field characteristic, such as the length of time since the word was added or the source of the word, and dynamically and selectively remove the words from the dictionary.

The AI platform (150) and the managers (152) and (154) are shown and described above with respect to dictionary identification and dynamic management. The managers (152) and (154) also include functionality to filter the intercepted communication, e.g. document, as shown and described in FIG. 5. In addition to the dictionary processing against the document that dynamically modifies the dictionary, the NL manager (152) dynamically applies the keyword comparison to the document. More specifically, the NL manager conducts a mathematical evaluation of a document based on a block score of the document words. The algorithm is used for assigning a block score is as follows:

$$ms(w_r) = \sum_{i=r-k}^{r+k} \log(i+a) * bs(w_i)$$

$$ms(w_r) = ms(w_r)/\log(\text{time elapsed})$$

where $ms(w_r)$ is the block score of word r which is computed by taking the weighted logarithmic average of block scores of words which lie in window ($w_{r-k}$, $w_{r+k}$), "a" is a configurable variable, and "k" is a window size which is a model configurable parameter. In one embodiment, k can be manually configured, or a model can be trained to find an optimal value of k. The "time elapsed" is the time when the blocked word was first identified. Using the block score for the words, the document as a whole may be computed. The following algorithm is used for computing a document score:

$$ms(\text{document}) = \sum_{word} bs(\text{word})/\text{total words}, \forall \text{ word}$$

The document score is then used to process the document with respect to presentation or transmission. The NL manager (152) assesses the document with respect to the document score, and subjects the document to a filtering action, which may have one of a few outcomes. Accordingly, a response is generated from the filtering action.

As shown a visual display (170) is operatively coupled to the server (110). The filtering action response may yield presentation of response output (172), such as the document, on the visual display (170), or it may yield transmission of the document to one or more of the devices (180)-(190) across the network (105). The filtering action may also be in the form of blocking the document from presentation on the visual display or from transmission to one or more devices across the network (105). In one embodiment, the NL manager (152) identifies a URL associated with the document, and the instituted filter action blocks or prevents presentation or transmission of any documents from the URL. Similarly, in one embodiment, the NL manager (152) may identify selection portions of the document that are subject to a redaction or masking, in which case the NL manager (152) redacts or masks those portions while enabling other portions to remain unmasked or non-redacted and to be transmitted to the visual display (170) or to a device operatively coupled to the server (110) across the network (105). It is understood that one or more of the devices (180)-(190) may be a receiving device to receive the communication, a network entry device, or a network device. The dynamic application of the filtering action to the communication by the NL manager (152) can be selectively applied to one or more of these receiving devices.

As shown, a data structure, DS (156), is operatively coupled to the NL manager. The DS (156) is populated with communication entities and their addresses, e.g. URLs. The NL manager (152) may selectively add or remove URLs from the list. Similarly, in one embodiment, the DS (156) is multi-dimensional and reflects relationships of URLs and corresponding documents. As the filtering action is applied to the document, the NL manager (152) dynamically reflects the URL associated with the document to the DS (156).

It is understood in the art that the document being evaluated may be a structured file. For example, the document may be separated into multiple content levels, such as chapters, sections, paragraphs, etc. The document assessment shown and described above may be applied on the basis of the document content level or a selection of content levels, with the application of the filter by NL manager (152) applied the probabilistic assessment of the designated document content levels.

It is understood that dynamic amendment of the dictionaries enables the dictionaries to respond to current conditions and actions. As the composition of the dictionary changes, the cognitive processing by the linguistic manager (154) and corresponding filter activity of the NL manager (152) is also subject to change. The linguistic manager (154) supports the dynamic characteristic(s) of the dictionary by supporting and enabling selective addition and removal of dictionary words. Accordingly, the linguistic manager (154) is configured to support adaptive and dynamic modification.

As shown, the AI platform (150) and the corresponding tools, including the NL manager (152) and the linguistic manager (154) integrate content and context assessment with respect to document processing and dynamic dictionary maintenance. The functionality of each tool is shown and described herein. A result of the content and context assessment generates an outcome of selective document filtering and/or dynamic amendment of the dictionary to exemplify keyword relationships. Types of information handling systems that can utilize the system (110) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet, computer (184), laptop, or notebook, computer (186), personal computer system (188), and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store ($190_A$), and mainframe computer (182) utilizes nonvolatile data store ($182_A$). The nonvolatile data store ($182_A$) can be a component that is external to the various information handling systems or can be internal to one of the information handling systems.

Figure 2:
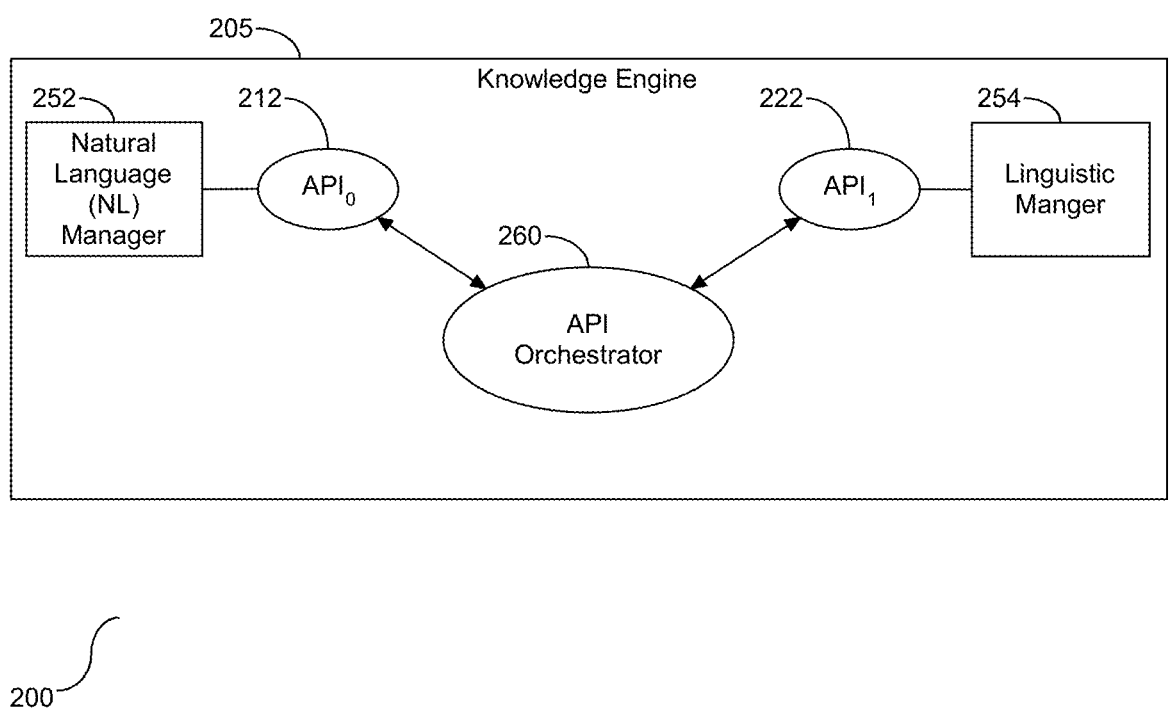
FIG. 2 depicts a block diagram illustrating the reliability assessment tools, as shown and described in FIG. 1, and their associated application program interfaces.

An Application Program Interface (API) is understood in the art as a software intermediary between two or more applications. With respect to the AI platform (150) shown and described in FIG. 1, one or more APIs may be utilized to support one or more of the tools (152) and (154) and their associated functionality. Referring to FIG. 2, a block diagram (200) is provided illustrating the tools (152) and (154) and their associated APIs. As shown, a plurality of tools are embedded within the knowledge engine (205), with the tools including the NL manager (252) associated with $API_0$ (212), and the linguistic manager (254) associated with $API_1$ (222). Each of the APIs may be implemented in one or more languages and interface specifications. $API_0$ (212) provides functional support commensurate with the NL manager (152); and $API_1$ (222) provides functional support commensurate with the linguistic manager (154). As shown, each of the APIs (212) and (222) are operatively coupled to an API orchestrator (260), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3A:
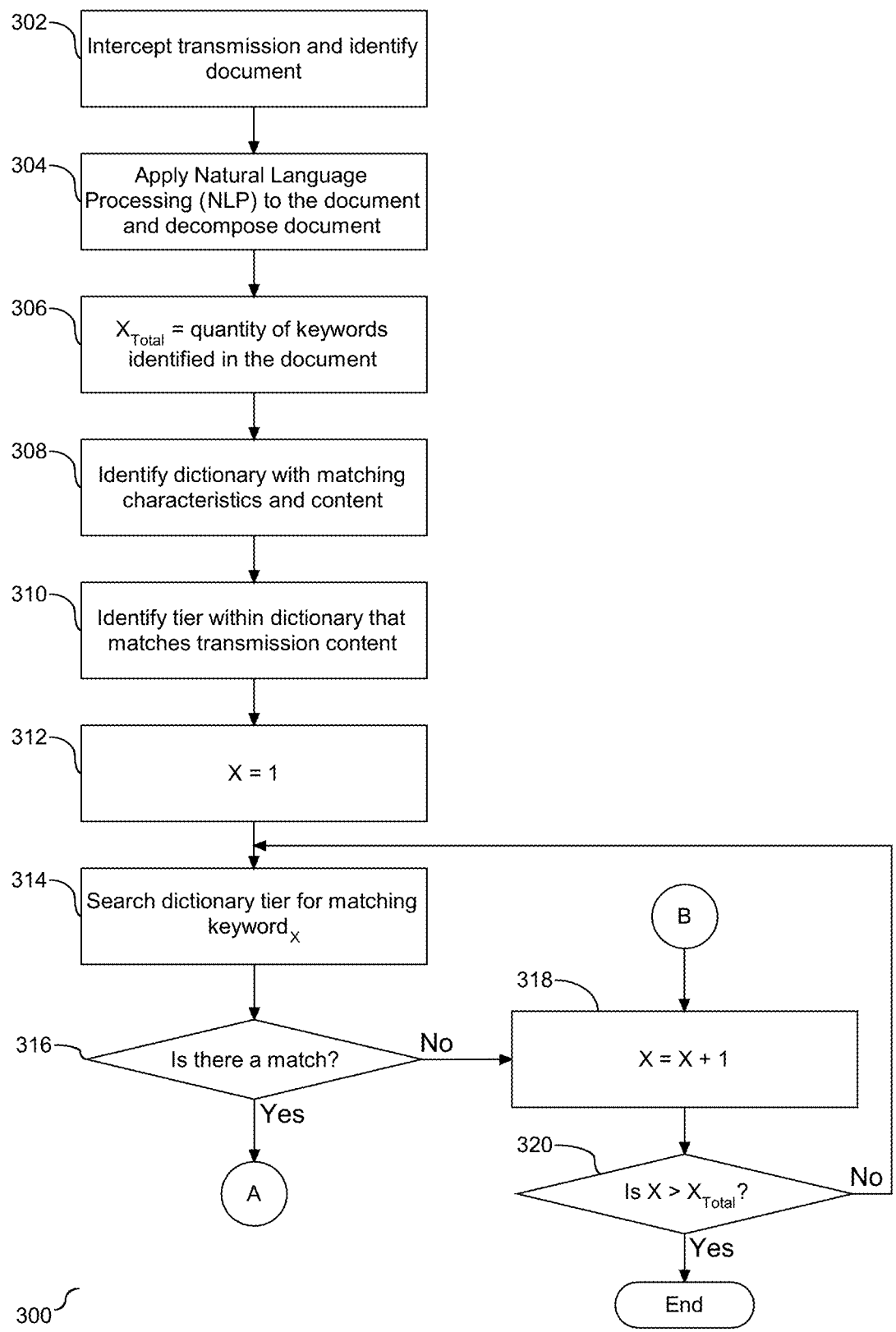
FIGS. 3A and 3B together depict a flow chart illustrating cognitive communication processing with respect to dynamically amending a dictionary of keywords against a communication.
Figure 3B:
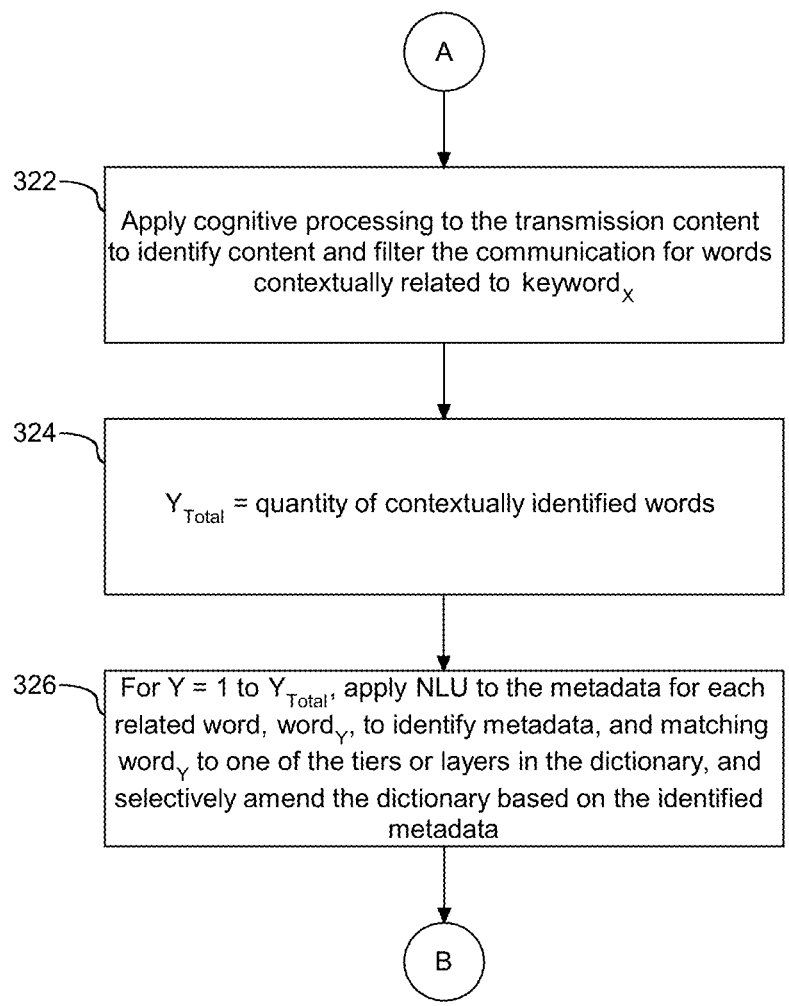

Referring together to FIGS. 3A and 3B, a flow chart (300) is provided to illustrate cognitive communication process with respect to dynamically amending the dictionary of keywords against the communication is processed. As shown, a transmission is intercepted and a corresponding document is identified (302). For example, in one embodiment, the transmission may be directed at a query, the corresponding document may be identified as responsive to the query. NLP processing is applied to the document, and more specifically to decompose the document into keywords (304). The keywords in the document may come in different forms, including, but not limited to, nouns, verbs, adjectives, and adverbs. A document keyword variable, $X_{Total}$ is assigned to the quantity of keywords identified in the document (306). It is understood that the intercepted transmission has corresponding characteristics and context. For example, in one embodiment, the characteristics may be the subject matter of the document, such as science, history, weather, etc. In one embodiment, the document characteristics are identified in document metadata. Similarly, in one embodiment, NLU is leveraged to identify document characteristics. In evaluating the intercepted transmission with respect to a keyword dictionary, it is important to conduct the assessment with respect to an appropriately classified dictionary. Following step (306) and before conducting a keyword assessment, a dictionary that matches the characteristics and context of the transmission is identified or selected (308). Accordingly, the dictionary utilized in the assessment is selected based on the characteristics and context of the document.

The dictionary may be a multi-dimensional structure, such as a hierarchy in which items are layered or grouped to reduce complexity. Referring to FIG. 4, a block diagram (400) is provided illustrating an example dictionary hierarchy. The dictionary is shown with three tiers in the hierarchy, shown herein as $Tier_0$ (410), $Tier_1$ (420), and $Tier_2$ (430). $Tier_0$ (410) represents a general category of the dictionary in the form of a parent $Node_{0,0}$ (412), which in this example is Science. $Tier_1$ (420) is shown with three example sub-categories of the general category and each related to the parent $Node_{0,0}$ (412). The sub-categories are shown in $Tier_1$ (420) as $Node_{1,0}$ (422), $Node_{1,1}$ (424), and $Node_{1,2}$ (426). In one example, $Node_{1,0}$ (422) may contain keywords related to the topic of Biology, $Node_{1,1}$ (424) may contain keywords related to the topic of Chemistry, and $Node_{1,2}$ (426) may contain keywords related to the topic of Physics. As further shown, $Tier_2$ (430) includes further sub-categories for each node represents in $Tier_1$ (420). As shown, $Tier_2$ (430)

includes $Node_{2,0}$ (432), $Node_{2,1}$ (434), $Node_{2,2}$ (436), $Node_{2,3}$ (438), $Node_{2,4}$ (440), $Node_{2,5}$ (442), $Node_{2,6}$ (444), $Node_{2,7}$ (446), and $Node_{2,8}$ (448) that represent keywords in each sub-category as related to a topic within the sub-category. For example, in one embodiment, $Node_{2,0}$ (432) is directed to $topic_0$, $Node_{2,1}$ (434) is directed to $topic_1$, $Node_{2,2}$ (436) is directed to $topic_2$, $Node_{2,3}$ (438) is directed to $topic_3$, $Node_{2,4}$ (440) is directed to $topic_4$, $Node_{2,5}$ (442) is directed to $topic_5$, $Node_{2,6}$ (444) is directed to $topic_6$, $Node_{2,7}$ (446) is directed to $topic_7$, and $Node_{2,8}$ (448) is directed to $topic_8$. Accordingly, the hierarchical representation of the dictionary demonstrates the organization and layering of groups.

Following the dictionary identification or selection at step (308), a tier within the dictionary that matches the context of the transmission is identified (310). Thereafter, the keyword counting variable, X, is initialized (312), the identified tier of the dictionary is leveraged to search for matching keywords (314). It is then determined if any keywords have been identified in the dictionary for $keyword_X$ from the transmission (316). A negative response to the determination is followed by an increment of the document keyword counting variable, X, (318), followed by an assessment to determine if all of the document keywords have been search in the dictionary (320). A negative response at to the determination is followed by a return to step (314). Accordingly, the dictionary is utilized as a source to identify keywords that match the identified transmission keywords.

A positive response to the determination at step (316) is an indication that there is at least one matching keyword found or otherwise identified in the dictionary. Cognitive processing is applied to the transmission content to identify context and to filter the communication for contextually related words to $keyword_X$ (322). The variable $Y_{Total}$ is assigned to the quantity of contextually identified words in the communication (324). NLU is applied to the metadata for each of the related words, $word_Y$, to identify metadata, such as sentiment, e.g. positive, negative, or neutral, match $word_Y$ to a specific tier or layer in the dictionary, and selectively amend the dictionary based on the identified metadata (326). The dictionary amendment may include adding one or more of the contextually related words to the dictionary, or in one embodiment, removing a corresponding keyword from the dictionary. The selective amendment is conducted dynamically and provides dynamic characteristics to the dictionary, e.g. the dictionary responds to the transmission assessment. As shown at step (326), the dictionary may be subject to pruning by selectively removing words. For example, in one embodiment, the words may be removed based on time elapse to reflect the latest context filtering. Accordingly, the amendment of the dictionary includes selectively adding and/or removing words.

Following the dictionary amendment processing at step (326), the process returns to step (318) for continued keyword processing. Once all of the identified keywords have been assessed, as shown by a negative response at step (320), the dictionary amendment process concludes. Accordingly, as shown and described in FIGS. 3A and 3B, the dictionary is subject to dynamic maintenance and amendment.

Figure 5:
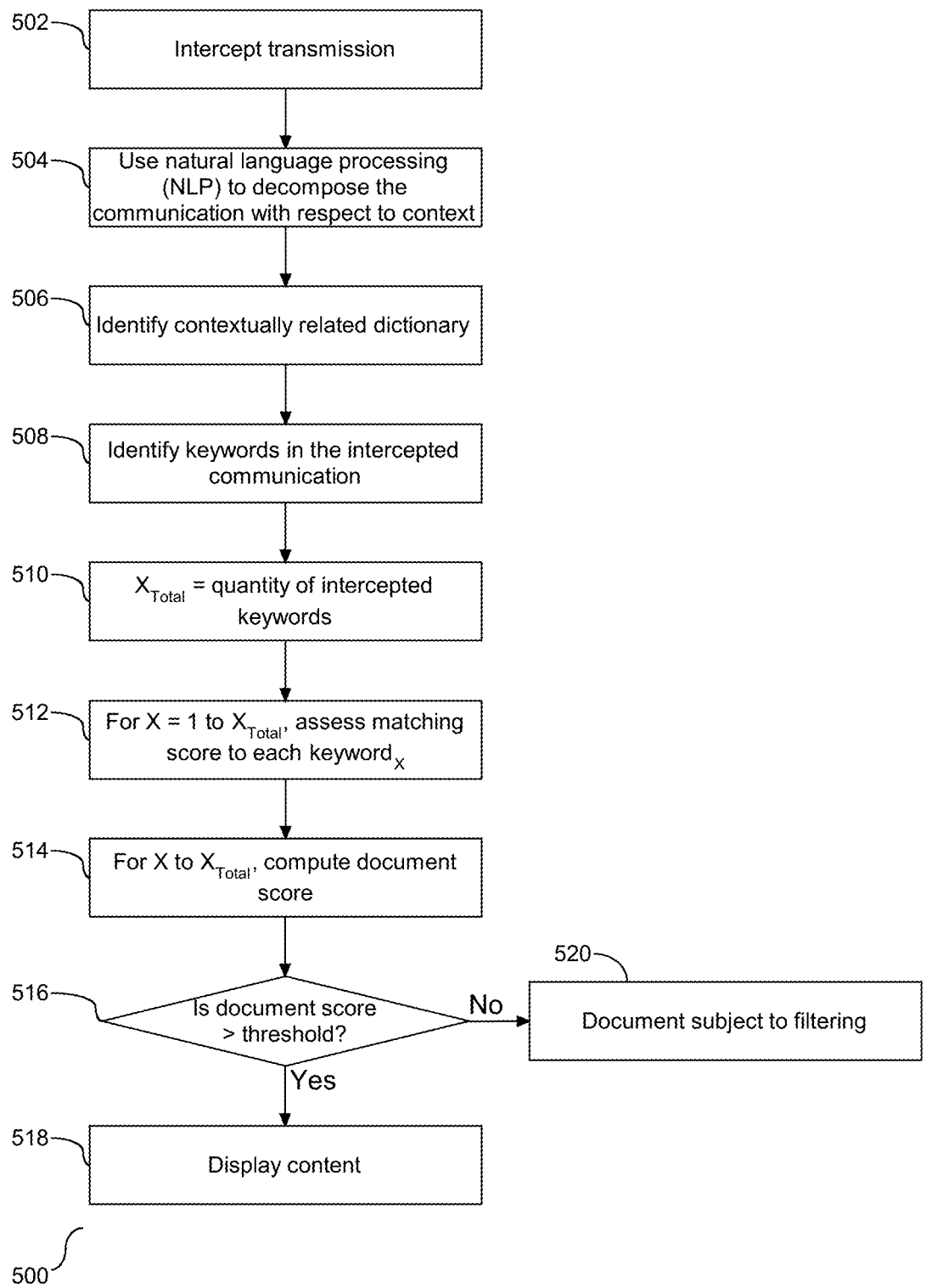
FIG. 5 depicts a flow chart illustrating a process for holistic assessment of transmission of the intercepted transmission.

In addition to dictionary maintenance, the intercepted transmission is subject to a holistic assessment transmission to a recipient. Referring to FIG. 5, a flow chart (500) is provided to illustrate a process for holistic assessment of the intercepted transmission. As shown, the transmission is intercepted (502) and subject to NLU to decompose the communication with respect to context (504). A dictionary determined to be contextually related to the intercepted communication is identified (506). In addition, keywords in the intercepted communication are identified (508), with the quantity assigned to the variable $X_{Total}$ (510). Using the dictionary, the document is assessed with respect to the identified keywords, including assessing a matching score to each of the identified $keywords_X$ (512). Using the assigned matching score from step (512), a document score is computed (514). The document score is utilized as a value against which document transmission is assessment. As shown herein, the document score is assessed against a threshold value (516). In one embodiment, the threshold value is configurable. If the document score is greater than or equal to the threshold, then the document transmission continues and the document is presented to an intended or identified recipient (518). Similarly, if the document score is less than the threshold, then the document is subject to filtering (520). Accordingly, the document score utilizes the block score to dynamically assess the content and context of the document for selective filtering and presentation.

The document filtering at step (520) can take on different forms. For example, the document filtering may be directed at identifying a uniform resource locator (URL) for the document, and blocking all documents associated with the identified URL, including the document subject to assessment. Similarly, in one embodiment, the document filtering blocks a domain, e.g. content category, corresponding to the communication. These are examples of blocking or otherwise preventing document transmission. In one embodiment, the document filtering enables document transmission while masking select text or textual components in the document that is transmitted. The masking utilizes NLP and a probabilistic assessment to identify select words or phrases in the document and to mask the identified words or phrases.

The document filtering shown and described in FIG. 5 is described on the level of a document and document transmission. It is understood that the filtering can be expanded or applied to another level of selective transmission. For example, in one embodiment, the filtering may determine that the document, or in one embodiment the URL associated with the intercepted document, should be prevented from transmission to a network entry device, all network devices, or a selection of network devices. Accordingly, the selective transmission may be expanded to prevent transmission of a document into a network of computing devices.

Embodiments may also be in the form of a computer program device for use with an intelligent computer platform in order to assist the AI platform (150) to identify one or more mathematically related candidates. The device has program code embodied therewith. The program code is executable by a processing unit to execute the functionality of the tools of the AI platform (150), e.g. the NL manager (152) and the linguistic manager (154). Aspects of the functional tools, e.g. NL manager and linguistic manager, and their associated functionality may be embodied in a computer system/server in a single location, or in one embodiment, may be configured in a cloud based system sharing computing resources.

With references to FIG. 6, a block diagram (600) is provided illustrating an example of a computer system/server (602), hereinafter referred to as a host (602) in communication with a cloud based support system, to implement the processes described above with respect to FIGS. 1-5. Host (602) is operational with numerous other general purpose or special purpose computing system environments or configurations. Examples of well-known computing systems, environments, and/or configurations that may be suitable for use with host (602) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (602) may be described in the general context of computer system-executable instructions, such as program modules, being executed by a computer system. Generally, program modules may include routines, programs, objects, components, logic, data structures, and so on that perform particular tasks or implement particular abstract data types. Host (602) may be practiced in distributed cloud computing environments where tasks are performed by remote processing devices that are linked through a communications network. In a distributed cloud computing environment, program modules may be located in both local and remote computer system storage media including memory storage devices.

Figure 6:
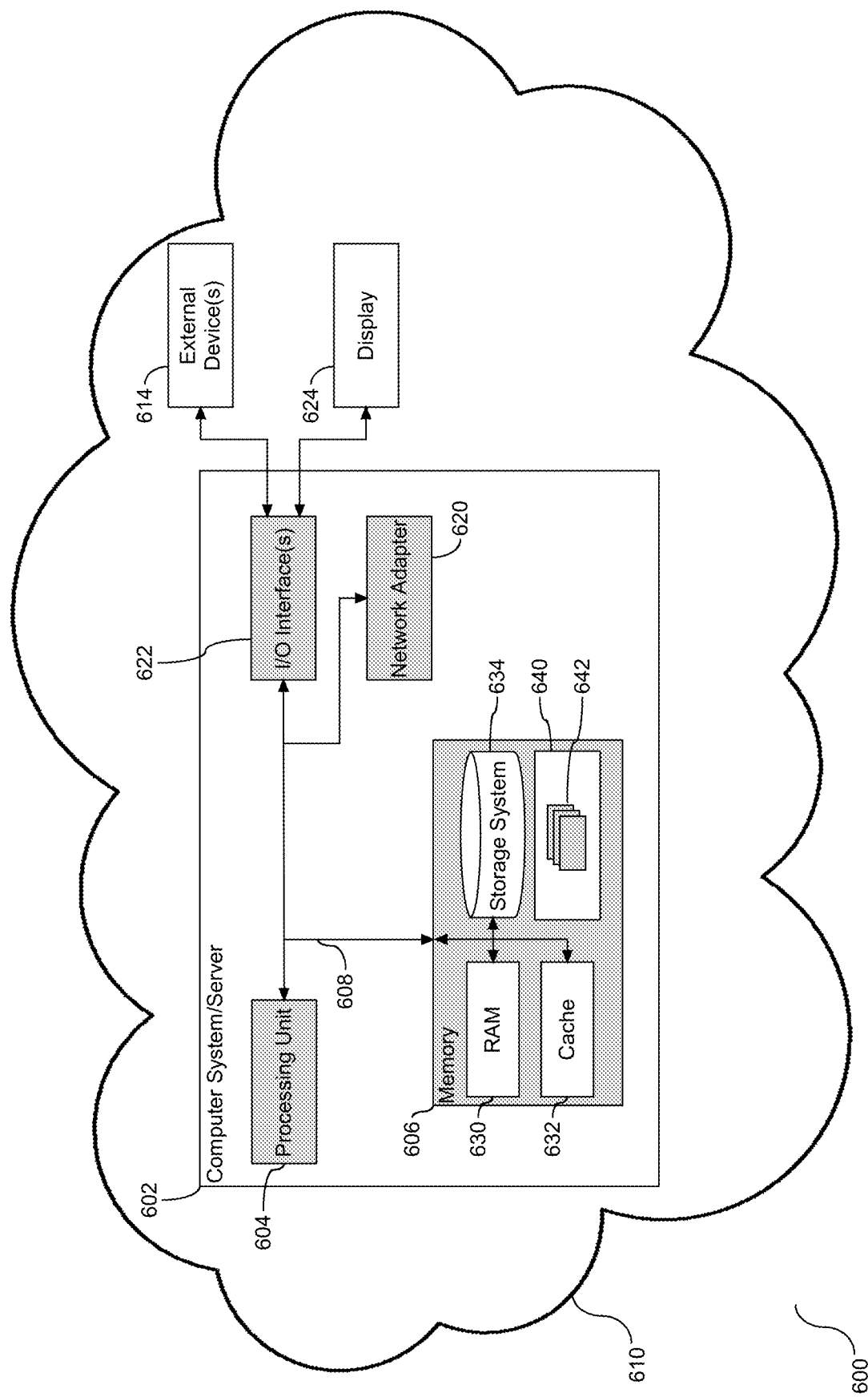
FIG. 6 depicts a block diagram illustrating an example of a computer system/server of a cloud based support system, to implement the system and process described above with respect to FIGS. 1-5.

As shown in FIG. 6, host (602) is shown in the form of a general-purpose computing device. The components of host (602) may include, but are not limited to, one or more processors or processing units (604), e.g. hardware processors, a system memory (606), and a bus (608) that couples various system components including system memory (606) to processor (604). Bus (608) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (602) typically includes a variety of computer system readable media. Such media may be any available media that is accessible by host (602) and it includes both volatile and non-volatile media, removable and non-removable media.

Memory (606) can include computer system readable media in the form of volatile memory, such as random access memory (RAM) (630) and/or cache memory (632). By way of example only, storage system (634) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (608) by one or more data media interfaces.

Program/utility (640), having a set (at least one) of program modules (642), may be stored in memory (606) by way of example, and not limitation, as well as an operating system, one or more application programs, other program modules, and program data. Each of the operating systems, one or more application programs, other program modules, and program data or some combination thereof, may include an implementation of a networking environment. Program modules (642) generally carry out the functions and/or methodologies of embodiments supported by the AI platform (150) and the tools (152) and (154). For example, the set of program modules (642) may include the modules configured as the NL and linguistic managers, as described in FIGS. 1-5.

Host (602) may also communicate with one or more external devices (614), such as a keyboard, a pointing device, etc.; a display (624); one or more devices that enable a user to interact with host (602); and/or any devices (e.g., network card, modem, etc.) that enable host (602) to communicate with one or more other computing devices. Such communication can occur via Input/Output (I/O) interface(s) (622). Still yet, host (602) can communicate with one or more networks such as a local area network (LAN), a general wide area network (WAN), and/or a public network (e.g., the Internet) via network adapter (620). As depicted, network adapter (620) communicates with the other components of host (602) via bus (608). In one embodiment, a plurality of nodes of a distributed file system (not shown) is in communication with the host (602) via the I/O interface (622) or via the network adapter (620). It should be understood that although not shown, other hardware and/or software components could be used in conjunction with host (602). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (606), including RAM (630), cache (632), and storage system (634), such as a removable storage drive and a hard disk installed in a hard disk drive.

Computer programs (also called computer control logic) are stored in memory (606). Computer programs may also be received via a communication interface, such as network adapter (620). Such computer programs, when run, enable the computer system to perform the features of the present embodiments as discussed herein. In particular, the computer programs, when run, enable the processing unit (604) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (602) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
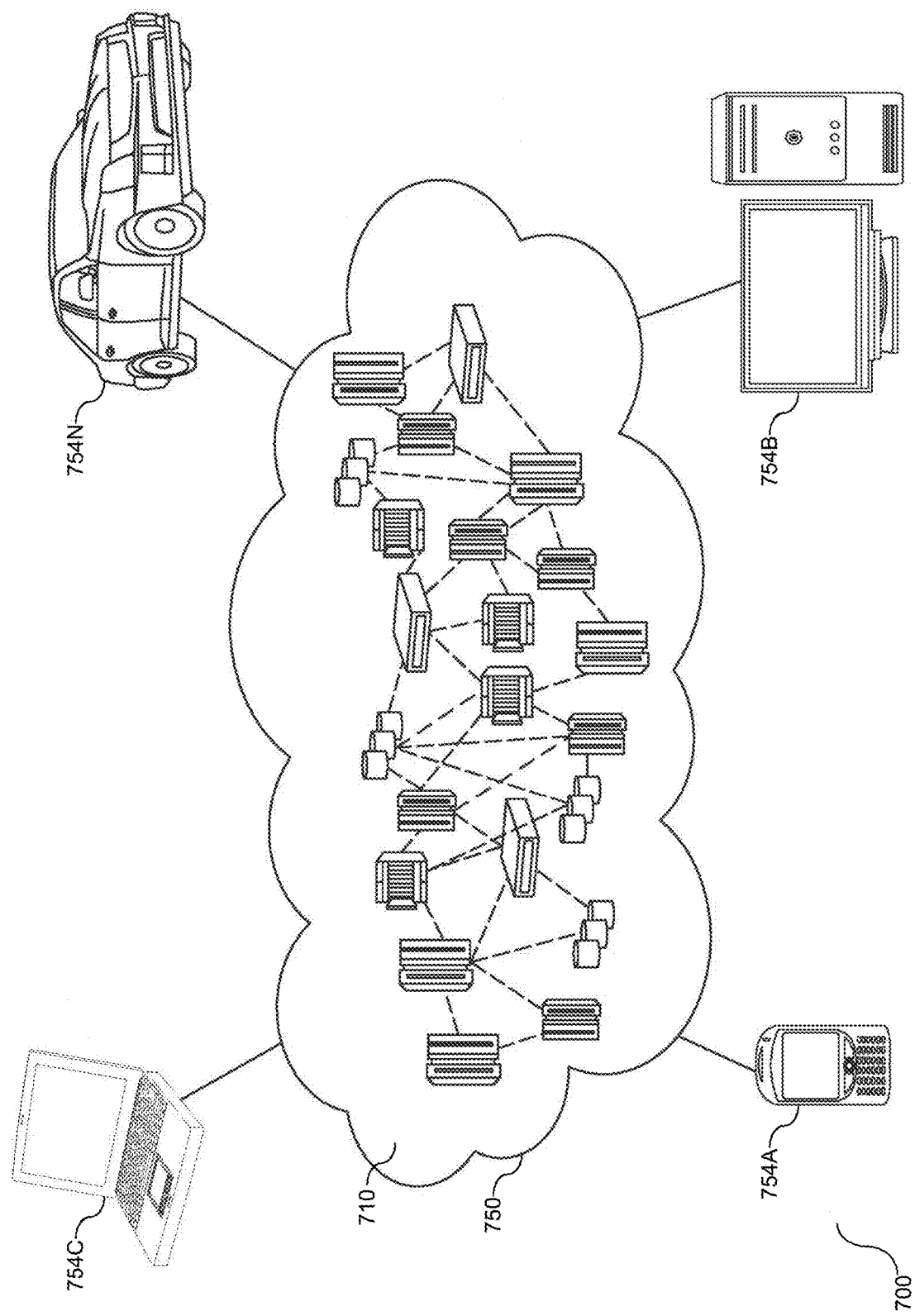
FIG. 7 depicts a block diagram illustrating a cloud computer environment.

Referring now to FIG. 7, an illustrative cloud computing network (700). As shown, cloud computing network (700) includes a cloud computing environment (750) having one or more cloud computing nodes (710) with which local computing devices used by cloud consumers may communicate. Examples of these local computing devices include, but are not limited to, personal digital assistant (PDA) or cellular telephone (754A), desktop computer (754B), laptop computer (754C), and/or automobile computer system (754N). Individual nodes within nodes (710) may further communicate with one another. They may be grouped (not shown) physically or virtually, in one or more networks, such as Private, Community, Public, or Hybrid clouds as described hereinabove, or a combination thereof. This allows cloud computing environment (700) to offer infrastructure, platforms and/or software as services for which a cloud consumer does not need to maintain resources on a local computing device. It is understood that the types of computing devices (754A-N) shown in FIG. 7 are intended to be illustrative only and that the cloud computing environment (750) can communicate with any type of computerized device over any type of network and/or network addressable connection (e.g., using a web browser).

Figure 8:
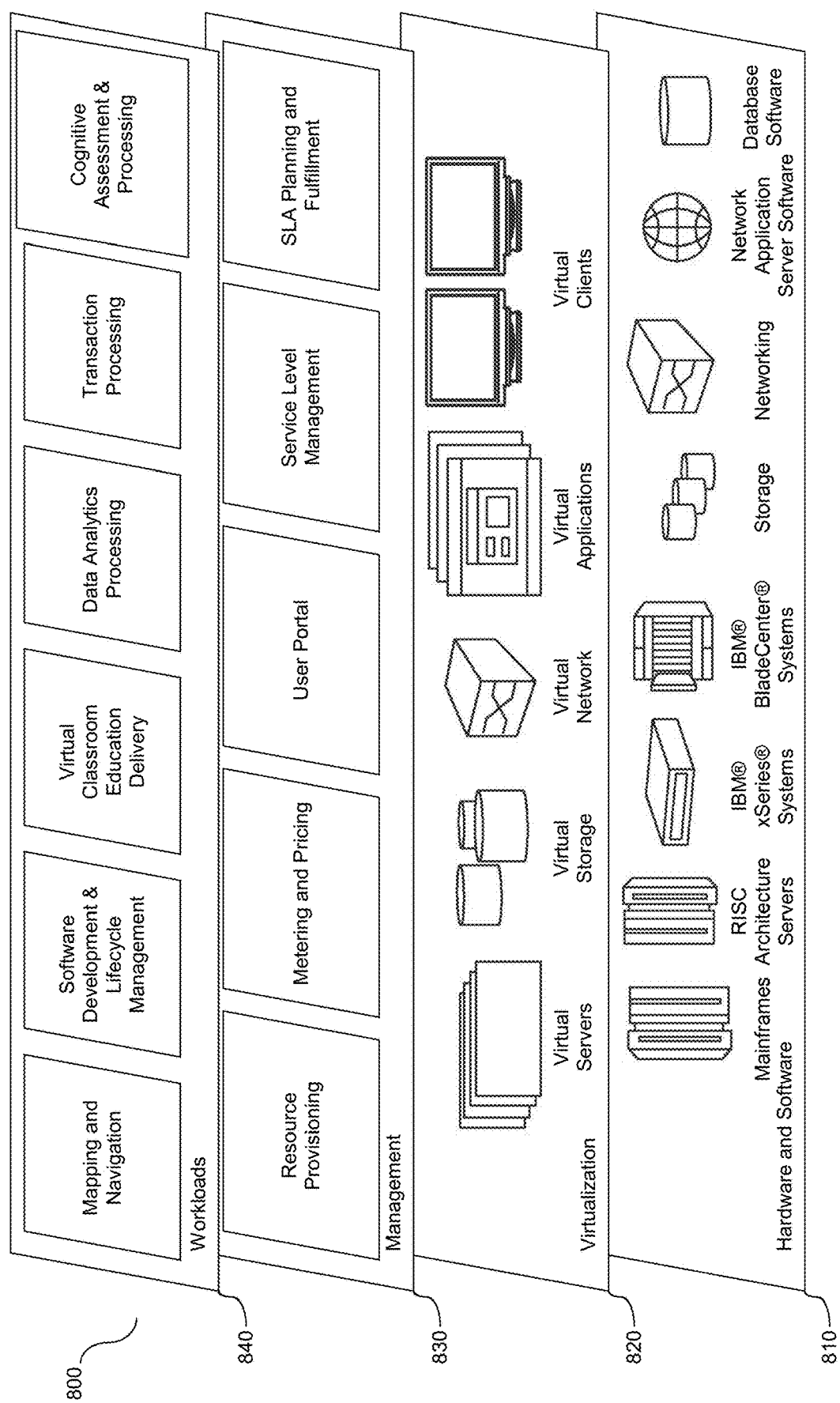
FIG. 8 depicts a block diagram illustrating a set of functional abstraction model layers provided by the cloud computing environment.

Referring now to FIG. 8, a set of functional abstraction layers (800) provided by the cloud computing network of FIG. 7 is shown. It should be understood in advance that the components, layers, and functions shown in FIG. 8 are intended to be illustrative only, and the embodiments are not limited thereto. As depicted, the following layers and corresponding functions are provided: hardware and software layer (810), virtualization layer (820), management layer (830), and workload layer (840). The hardware and software layer (810) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (820) provides an abstraction layer from which the following examples of virtual entities may be provided: virtual servers; virtual storage; virtual networks, including virtual private networks; virtual applications and operating systems; and virtual clients.

In one example, management layer (830) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (840) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and cognitive assessment and management.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

The embodiments are described herein with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single dataset, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of the disclosed embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated. Accordingly, the linguistic application provides context sensitivity with respect to document assessment and dictionary management.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For non-limiting examples, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

It will be appreciated that, although specific embodiments have been described herein for purposes of illustration, various modifications may be made without departing from the spirit and scope of the embodiments. Accordingly, the scope of protection of the embodiments is limited only by the following claims and their equivalents.

What is claimed is:

1. A computer system comprising:
   a processing unit operatively coupled to memory;
   an artificial intelligence (AI) platform in communication with the processing unit, the AI platform configured to implement at least one program module configured to:
      utilize natural language processing (NLP) to decompose communication content, including identify one or more keywords in the communication;
      assess a probabilistic block score to the identified one or more keywords, the probabilistic block score including a time elapsed factor, and incorporate the time elapsed factor into keyword metadata;
      identify a dictionary contextually related to the communication, and analyze the communication, including:
         compare the one or more identified keywords against dictionary keywords for the contextually identified dictionary;
         dynamically amend the contextually identified dictionary to add one or more semantically related communication keywords not present in the identified dictionary based on the keyword metadata; and
         selectively apply cognitive processing to the communication and the keyword comparison, including identify context of the communication, and dynamically filter the communication for one or more contextually related keywords;
      dynamically apply a filtering action to the communication; and
   the AI platform configured to generate a response from the dynamically applied filtering action, including selective transmission of the communication.

2. The system of claim 1, wherein the filtering action comprises blocking the communication, blocking a uniform resource location (URL) of a resource related to the communication, blocking a domain corresponding to the communication, or masking select text in the communication.

3. The system of claim 1, further comprising the program module configured to apply the dynamically applied filtering action to a device comprising a receiving device designated to receive the communication, a network entry device, or all network devices.

4. The system of claim 1, wherein the dynamically applied filtering action includes the program module to mask one of more of the communication keywords to the communication, and further comprising the program module configured to apply the masking to the selective communication transmission.

5. The system of claim 1, further comprising the program module configured to compile a list of communication entities, including identify a uniform resource location (URL) of a resource related to the communication and dynamically add the URL to the list responsive to the application of the filtering action.

6. The system of claim 1, wherein the dynamic application of the filtering model including the program module to conduct a probabilistic assessment across one or more content levels, the content level comprising document, passage, keyword, or a combination thereof, and selectively apply blocking to the assessed content level.

7. A computer program product for applying cognitive processing to communication transmission, the computer program product comprising a computer readable storage device having program code embodied therewith, the program code executable by a processor to:
   apply natural language processing (NLP) to decompose communication content and identify one or more keywords in the communication;
   assess a probabilistic block score to the identified one or more keywords, the probabilistic block score including a time elapsed factor, and incorporate the time elapsed factor into keyword metadata;
   identify a dictionary contextually related to the communication, and analyze the communication, including:
      compare the one or more identified keywords against dictionary keywords for the contextually identified dictionary;
      dynamically amend the contextually identified dictionary to add one or more semantically related communication keywords not present in the identified dictionary based on the keyword metadata; and
      selectively apply cognitive processing to the communication and the keyword comparison, including identify context of the communication, and dynamically filter the communication for one or more contextually related keywords;
   dynamically apply a filtering action to the communication; and
   generate a response from the dynamically applied filtering action, including selective transmission of the communication.

8. The computer program product of claim 7, wherein the filtering action comprises blocking the communication, blocking a uniform resource location (URL) of a resource related to the communication, blocking a domain corresponding to the communication, or masking select text in the communication.

9. The computer program product of claim 7, further comprising program code to apply the dynamically applied filtering action to a device comprising a receiving device designated to receive the communication, a network entry device, or all network devices.

10. The computer program product of claim 7, wherein the dynamically applied filtering action includes program code to mask one of more of the communication keywords to the communication, and further comprising program code to apply the masking to the selective communication transmission.

11. The computer program product of claim 7, further comprising program code to compile a list of communication entities, including identify a uniform resource location (URL) of a resource related to the communication and dynamically add the URL to the list responsive to the application of the filtering action.

12. The computer program product of claim 7, wherein the dynamic application of the filtering model includes program code to conduct a probabilistic assessment across one or more content levels, the content level comprising document, passage, keyword, or a combination thereof, and selectively apply blocking to the assessed content level.

13. A method comprising:
   utilizing natural language processing (NLP) to decompose communication content, including identifying one or more keywords in the communication;
   assessing a probabilistic block score to the identified one or more keywords, the probabilistic block score including a time elapsed factor, and incorporate the time elapsed factor into keyword metadata;

identifying a dictionary contextually related to the communication, and analyzing the communication, the analysis including:
    comparing the one or more identified keywords against dictionary keywords for the contextually identified dictionary;
    dynamically amending the contextually identified dictionary to add one or more semantically related communication keywords not present in the identified dictionary based on the keyword metadata; and
    selectively applying cognitive processing to the communication and the keyword comparison, including identifying context of the communication, and dynamically filter the communication for one or more contextually related keywords;
dynamically applying a filtering action to the communication; and
generating a response from the dynamically applied filtering action, including selectively transmitting the communication.

14. The method of claim 13, wherein the filtering action comprises blocking the communication, blocking a uniform resource location (URL) of a resource related to the communication, blocking a domain corresponding to the communication, or masking select text in the communication.

15. The method of claim 13, further comprising applying the dynamically applied filtering action to a device comprising a receiving device designated to receive the communication, a network entry device, or all network devices.

16. The method of claim 13, wherein the dynamically applied filtering action includes masking one of more of the communication keywords to the communication, and further comprising applying the masking to the selective communication transmission.

17. The method of claim 13, further comprising compiling a list of communication entities, including identifying a uniform resource location (URL) of a resource related to the communication and dynamically adding the URL to the list responsive to the application of the filtering action.

18. The method of claim 13, wherein the dynamic application of the filtering model conducts a probabilistic assessment across one or more content levels, the content level comprising document, passage, keyword, or a combination thereof, and selectively applying blocking to the assessed content level.

\* \* \* \* \*